United States Patent [19]
Radke et al.

[11] 3,758,158
[45] Sept. 11, 1973

[54] SEAT BELT ANCHOR MECHANISM FOR ADJUSTABLE SEAT

[75] Inventors: Arthur O. Radke; Donald C. Galbraith, both of Milwaukee, Wis.

[73] Assignee: Universal Oil Products Company, Des Plaines, Ill.

[22] Filed: Dec. 29, 1971

[21] Appl. No.: 213,621

[52] U.S. Cl................. 297/385, 297/388, 248/399
[51] Int. Cl..... A62b 35/00, B60n 21/10, B60n 1/00
[58] Field of Search.................... 248/377, 378, 399, 248/419, 421, 429; 297/308, 385, 386, 388; 296/65 R, 65 O; 74/469; 280/150, 9 B

[56] References Cited
UNITED STATES PATENTS

| 3,493,211 | 2/1970 | Barecki et al...................... 248/399 |
| 3,186,760 | 6/1965 | Lohr et al........................... 297/216 |
| 3,109,621 | 11/1963 | Simons et al. ...................... 248/399 |

Primary Examiner—Casmir A. Nunberg
Attorney—James R. Hoatson, Jr. et al.

[57] ABSTRACT

Seat belt anchor mechanism for vertically movable suspension seat having fore and aft adjustment feature provides an anchor point for a lap belt which is spaced from the floor and movable vertically relative to the floor. The anchor point is carried by a slide on the upper movable seat frame and is movable vertically with the seat suspension but remains stationary when the upper movable seat frame is adjusted fore and aft. Thus, a tether belt connecting the slide to the floor can be kept taut when the suspension is at the upper end of its ride zone, irrespective of the position of the seat in a fore and aft direction. The mechanism includes a plurality of pivot links which are related to each other in such a manner that the anchor point for the lap belt has no horizontal component of movement as the seat suspension goes up and down through its entire movement range.

4 Claims, 4 Drawing Figures

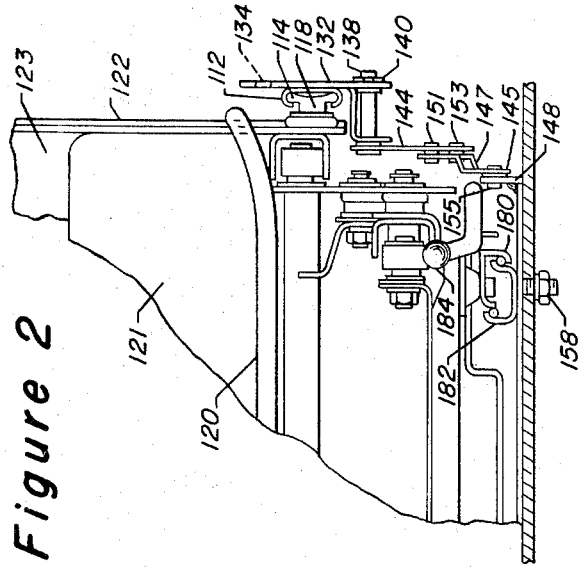
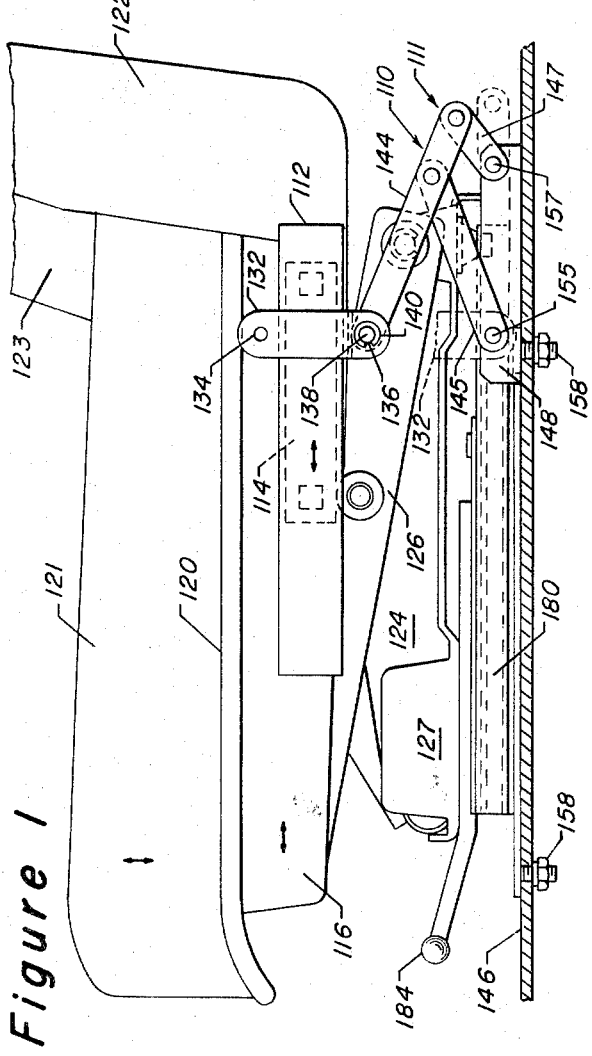
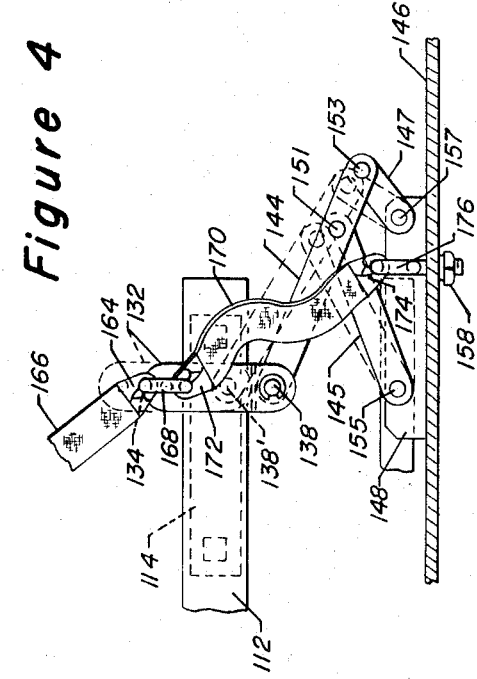
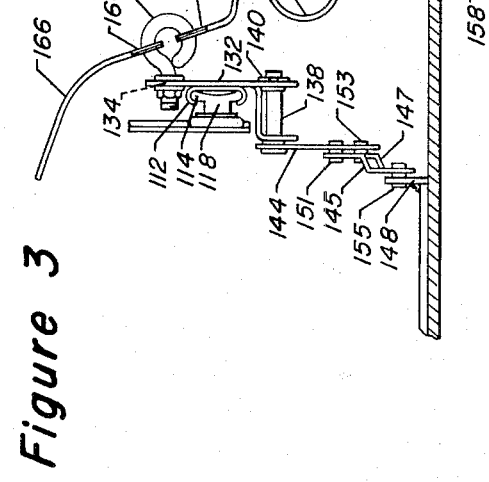

SEAT BELT ANCHOR MECHANISM FOR ADJUSTABLE SEAT

BACKGROUND OF THE INVENTION

This invention relates to an anchor mechanism for a seat belt and more particularly, to such a mechanism for use with a suspension seat having a large amount of vertical travel for isolating the occupant from shocks and vibrations, and substantial horizontal travel for adjusting the position of the seat fore and aft to the position most comfortable to a particular occupant.

Although the conventional floor mounting for a seat belt is quite satisfactory for an automobile wherein the seat permits a very limited degree of vertical motion, it is not satisfactory for use with a suspension seat which generally provides four or more inches of vertical travel. In suspension seats, it has been common to anchor the lap belt to the side of the movable frame of the seat and then anchor the movable seat frame to the floor with a tether belt which is adjusted to be taut in the extreme upper position of the suspension. An example of such a mounting can be seen in U.S. Pat. No. 3,493,211. A problem with the last mentioned type of mounting arises when the seat is of the type having a capability of being adjusted in a fore and aft direction. Since a typical fore and aft adjustment range for such a seat is about 4 inches, it will be readily appreciated that the movable seat frame to floor tether belt must be sufficiently long to accommodate the entire range of vertical seat movement while the seat is in its extreme forward position. When the seat is in any other fore and aft position, the tether belt will be slack in the uppermost position of the seat suspension and therefore incapable of offering any restraint until after the seat has been damaged by being moved upwardly beyond its upper limit.

SUMMARY

The seat belt anchor mechanism of the present invention overcomes the problem of too much slack in the tether belt by anchoring the lap belt and connecting the tether belt to a support member which is free to move up and down with the seat but which is restrained from moving horizontally at any vertical position of the seat by being connected to a pivot linkage which is attached to the floor and to the support member. The support member includes a guide portion which cooperates with a slide member affixed to the movable seat frame to permit the seat and slide member to move horizontally relative to the guide portion so that the seat can be adjusted fore and aft to the position most comfortable to an occupant without affecting the amount of slack in the tether belt. The slide member also transmits the vertical motion of the seat frame and suspension to the guide portion which moves up and down with the pivot linkage in a vertical path throughout the vertical movement range of the seat suspension.

BRIEF DESCRIPTION OF THE DRAWINGS

FIG. 1 is a side plan view showing the improved seat belt anchor mechanism except for lap and tether belts, in its installed position attached to a suspension seat (shown in the mid-position of its ride zone) and to the floor of a vehicle;

FIG. 2 is a front plan view showing the seat belt anchor mechanism of FIG. 1 and a fragmentary portion of the seat structure;

FIG. 3 is a front plan view similar to FIG. 2 but eliminating the seat support structure and showing the seat belt anchor mechanism with a lap belt and a floor tether belt attached to it; and FIG. 4 is a side plan view similar to FIG. 1 but eliminating the seat support structure and showing the seat belt anchor mechanism attached to a lap belt and a floor mounted tether belt.

DESCRIPTION OF THE PREFERRED EMBODIMENTS

Referring to FIG. 1, the improved seat belt anchor mechanism is indicated generally at 110 and includes a guide member 112 which cooperates with slide member 114 mounted therein for horizontal movement. The slide member 114 is mounted to the side of the movable seat frame 116 by means of fasteners 118. Mounted on the top of the seat frame 116 is a seat pan 120 which carries a cushion 121. A back support frame member 122 is pivotally fastened on the seat frame member 116 and is adapted to support a back cushion member 123. The seat pan member 120 can move upwardly and downwardly to absorb vibrations of the vehicle since it is mounted to a suspension system including springs (not shown), a shock absorber (not shown) and first and second scissors link members 124, 126 which are pivoted to each other and supported at their lower ends on a main frame 127 carried by seat track member 180 which is movable fore and aft relative to the floor 146 of the vehicle.

The anchor mechanism 110 includes a 3 bar pivot linkage indicated generally at 111 and a guide member 112 which is slidable horizontally relative to slide member 114 attached to the upper movable seat support frame 116.

Attached to the seat support frame 116 is a seat pan 120 carrying a cushion 121 and a back frame portion 122 carrying a back cushion 123. A seat belt support member 132 is integrally attached to the guide member 122 such as by welding and includes an upper hole 134 to which a seat belt 166 is attached and a lower hole 136 which carries a support pin 138 which is held in place by a retainer ring 140. The forward end of an upper link member 144 is pivotally attached to the support member 132 by pin 138. The upper link 144 is in turn supported by a lower front link 145 and a lower rear link 147 which are attached, respectively, to a linkage support member 148 at pivot connections 155, 157. The linkage support member 148 is attached to the floor 146 of the vehicle by means of floor bolts 158.

The pivot linkage 111 is preferably mounted as shown in FIG. 2 so as to be positioned under a rear portion of the seat. The links 145 and 147 preferably include offset portions to permit the loads applied thereto to be transferred from the pin 138 to the support member 148. In this manner the elements of the pivot linkage are positioned such that they are out of the way so that they will not interefere with either the seat occupant or with the structure under the front of the seat such as the lever 184 which unlocks the seat track.

In the drawings, the seat suspension and the seat belt anchor mechanism 110 are shown in an intermediate position of the 4 inch vertical movement range of the suspension. The dotted line positions of the linkage 111 shown in FIGS. 1 and 4 show the lower and upper positions of the linkage.

Although the lengths of the various links 144, 145 and 147 may be determined by trial and error, it is possible to easily determine appropriate lengths of these links to cause the support pin 138 to move in a vertical straight line path. This may be done by causing link 145 to have a length between its pivots equal to the vertical movement range of the seat, for example 4 inches. The link 147 is then given a length of $\sqrt{3/2}$ times the adjustment range of 3.464 inches. The link 144 has a length equal to the total of the other two links or 7.464 inches. The pivot points 155, 157 should also be spaced apart by the length of link 145 so that all of the links will lie in line in the lowest seat position as shown in dotted lines in FIG. 1. If desired, the link 145 can also be made of a length greater than the vertical movement range of the suspension. In such a case, the link 147 should have a length sufficient to reach the upper link and be directed at an angle which bisects the angle determined by the link 145 and a line connecting pivot points 155, 157. Thus, the lap belt 166 will, once tightened for a particular fore and aft seat position, retain a constant tension relative to a seat occupant so that the occupant will be comfortable.

From the preceding description, it will be obvious that the uppermost position which can be assumed by anchor support pin 138 is the position illustrated in dotted lines at 138' in FIG. 4. Since the pin 138 does not move as the seat is adjusted back and forth to the position most comfortable to the seat occupant, the tether belt 170 can be made of an exact length or adjusted to a length so that it will be taut when the support pin 138 is at position 138'. Thus, in the event of a collision or sudden deceleration, the lap belt 166 will not only firmly anchor the occupant to the seat frame as it does at all times but will also be firmly anchored to the floor 146 by the tether belt 170 as soon as the seat suspension reaches the top of its travel path. Such an anchorage is much more desirable than prior art anchorages in which the tether belt is fixed to the side of the seat and is adjusted to be taut when the seat is in its most forward upper position since the tether belt in such an anchorage would not be taut in rearward seat positions unless the seat structure had first deformed. Although such prior art anchorages could also have their tether belts adjusted to a shorter length where they would be taut for any fore and aft seat position, the suspension would of course only be able to travel its full vertical movement range at one position of fore and aft adjustment.

A pair of sister hooks 164 on the end of a lap belt 166 mount the lap belt to an eye bolt 168 fastened through hole 134 in support member 132. The eye bolt 168 is also connected to the upper end of the tether belt 170 which has a pair of sister hooks 172 on its upper end and a similar pair of hooks 174 on its lower end which engage an eye bolt 176 mounted on the floor 146 of the vehicle. The lap belt and the tether belt are preferably made of a web material such as nylon and are conventional.

To provide a capability of fore and aft horizontal adjustment movement, the upper movable seat frame 116 has a seat track member 180 attached to it which rides on and is guided by a floor track member 182 mounted on the floor 146 of the vehicle. The horizontal adjustment lever 184 is operated in the usual manner to release the seat track member 180 to adjust the seat to any desired horizontal position.

We claim as our invention:

1. A seat belt anchor mechanism for a suspension seat having an upper seat support frame movable vertically and horizontally relative to a lower seat frame and to the frame of a vehicle to which the lower seat frame is adapted to be fastened, characterized in that said anchor mechanism comprises slide means including a guide member and a slide member slidable on said guide member, one of said members being fixed to said upper seat support frame and the other of said members being connected to the lower seat frame by pivot link means comprising an upper pivot link member which is attached at one end to the anchor support means, said upper link being attached to the lower seat support frame by a pair of pivoted links which are of different lengths and which are pivotally connected at one of their ends to said lower seat support frame and at their opposite ends to the opposite end and to an intermediate portion of said upper pivot link, and seat belt anchor support means integral with said other of said members and movable therewith, said anchor support means being movable vertically in response to up and down movements of said upper seat support frame but remaining stationary relative to the lower seat support frame in response to horizontal fore and aft adjustment movements of said upper seat support frame.

2. A seat belt anchor mechanism in accordance with claim 1 wherein said pair of pivoted links are mounted to said lower seat support frame at points spaced from each other, at least the major portion of the length of each of said plurality of pivot link members being positioned at all times to the rear of said seat belt anchor support means.

3. A seat belt anchor mechanism in accordance with claim 1 wherein a first link of said pair of pivoted links is at least as long as the vertical movement range of the seat suspension, the second link of said pair of pivoted links being spaced from the first link by the length of the first link and being connected to said upper pivoted link at a point lying on a line bisecting the angle formed by the first link and the line connecting the lower pivot points of said first and second links.

4. A seat belt anchor mechanism in accordance with claim 1 wherein a first link of said pair of links has a length equal to the vertical movement range of the seat suspension, the second link of said pair has a length equal to $\sqrt{3/2}$ times the length of the first link, the upper link has a length equal to the combined length of the pair of links, the pair of links have their lower pivots spaced apart by the length of said first link, with the lower pivot point for said first link being directly under the seat belt anchor support means, and said intermediate portion of said upper pivot link being spaced from its ends by distances equal to the lengths of said first and second links.

* * * * *